United States Patent
Biermann et al.

(10) Patent No.: US 11,067,152 B2
(45) Date of Patent: Jul. 20, 2021

(54) DRIVE DEVICE FOR A MOTOR VEHICLE

(71) Applicant: Schaeffler Technologies AG & Co. KG, Herzogenaurach (DE)

(72) Inventors: Thorsten Biermann, Wachenroth (DE); Christian Lutz, Creußen (DE); Daniel Burghardt, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/603,858

(22) PCT Filed: Apr. 9, 2018

(86) PCT No.: PCT/DE2018/100312
§ 371 (c)(1),
(2) Date: Oct. 9, 2019

(87) PCT Pub. No.: WO2018/188691
PCT Pub. Date: Oct. 18, 2018

(65) Prior Publication Data
US 2020/0116236 A1    Apr. 16, 2020

(30) Foreign Application Priority Data
Apr. 11, 2017 (DE) .................... 102017107803.7

(51) Int. Cl.
F16H 1/46       (2006.01)
B60K 17/16      (2006.01)
F16H 3/66       (2006.01)
F16H 37/08      (2006.01)
F16H 48/11      (2012.01)
(Continued)

(52) U.S. Cl.
CPC ........... F16H 3/66 (2013.01); F16H 37/0806 (2013.01); F16H 48/11 (2013.01); *B60K 2001/001* (2013.01); *F16H 2048/102* (2013.01); *F16H 2048/106* (2013.01); *F16H 2048/364* (2013.01); *F16H 2057/02034* (2013.01)

(58) Field of Classification Search
CPC ............... F16H 48/11; F16H 2048/364; F16H 2048/106; F16H 2028/102; F16H 2057/02034; B60K 2001/001
See application file for complete search history.

(56) References Cited

U.S. PATENT DOCUMENTS 5,845,732 A    12/1998  Taniguchi et al.
8,974,341 B2 *  3/2015  Smetana ............... H02K 7/112
                                                        475/8

(Continued)

FOREIGN PATENT DOCUMENTS

DE    102011007260 A1   10/2012
DE    102011079975 A1   1/2013
(Continued)

*Primary Examiner* — Charles A Fox
*Assistant Examiner* — Farhana Pervin
(74) *Attorney, Agent, or Firm* — Reid A. Baldwin

(57) ABSTRACT

A drive device includes a drive machine, such as an electric motor, gear reduction planetary gear sets, and a differential. One of the gear reduction planetary gear sets utilizes multi-step planetary gears. The differential is a spur gear differential. To reduce axial length, one of the gearwheels of each multi-step planetary gears axially overlaps with planetary gears of the spur gear differential.

13 Claims, 1 Drawing Sheet

(51) Int. Cl.
    *F16H 48/10*     (2012.01)
    *F16H 57/02*     (2012.01)
    *F16H 48/36*     (2012.01)
    *B60K 1/00*     (2006.01)

(56) References Cited

U.S. PATENT DOCUMENTS

| | | | |
|---|---|---|---|
| 2007/0259747 A1 | 11/2007 | Thomas et al. | |
| 2009/0111641 A1* | 4/2009 | Kim | B60K 6/365 477/5 |
| 2009/0197727 A1* | 8/2009 | Janson | B60K 6/52 475/5 |
| 2013/0172139 A1* | 7/2013 | Todd | F16H 3/72 475/1 |
| 2015/0377334 A1* | 12/2015 | Swales | F16H 48/10 475/220 |

FOREIGN PATENT DOCUMENTS

| | | | |
|---|---|---|---|
| DE | 102012011686 A1 | 12/2013 | |
| DE | 102014206667 | 10/2015 | |
| DE | 102014209941 A1 | 11/2015 | |
| DE | 102015214031 A1 | 1/2017 | |
| DE | 102017111042 A1 * | 11/2018 | B60K 17/04 |

\* cited by examiner

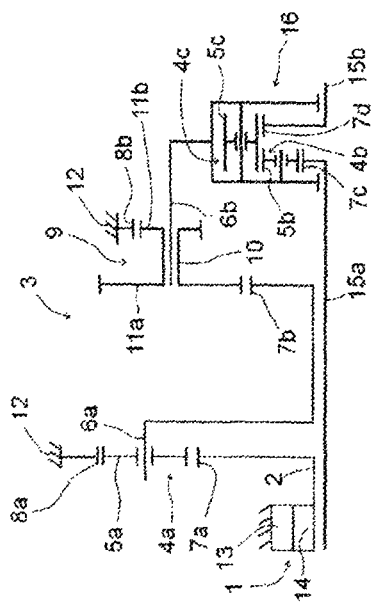
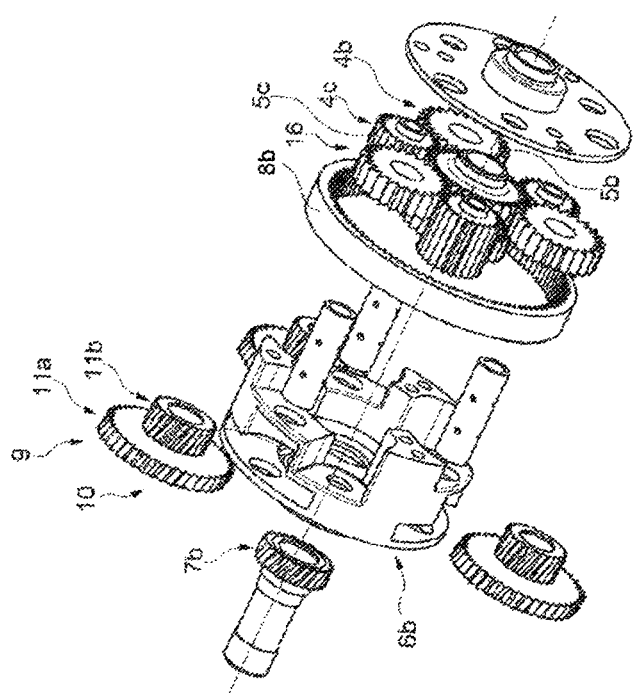

DRIVE DEVICE FOR A MOTOR VEHICLE

CROSS-REFERENCE TO RELATED APPLICATIONS

This application is the U.S. National Phase of PCT Appln. No. PCT/DE2018100312 filed Apr. 9, 2018, which claims priority to DE 102017107803.7 filed Apr. 11, 2017, the entire disclosures of which are incorporated by reference herein.

TECHNICAL FIELD

The disclosure relates to a drive device having a transmission device for a motor vehicle.

BACKGROUND

DE 10 2012 011 686 A1 discloses a transmission gear unit and differential gear unit having a housing, having an input shaft and two output shafts which are arranged coaxially with respect to the input shaft. A transmission section and a differential section which is configured as a spur gear differential are provided, the transmission section having two planetary stages, namely an input stage and a load stage. The sun gear of the input stage is connected effectively to the input shaft. The load stage has an internal gear which is fixed on the housing, and the sun gear of the load stage is connected effectively via a spider to at least one planetary gear of the input stage. At least one planetary gear of the load stage can be connected effectively via a spider to the internal gear of the input stage. Via a correspondingly provided and/or arranged coupling device, the internal gear of the input stage can be coupled and decoupled effectively to the spider of the load stage.

Furthermore, DE 10 2011 007 260 A1 discloses a drive device having at least one electric machine, having a manual transmission, having a differential which can be driven by way of the electric machine via the manual transmission, having at least one torque-proof first operative connection between a first drive shaft of the electric machine and the manual transmission, having a shifting clutch which is oriented co-axially with respect to the electric machine in a second operative connection between the first drive shaft and the manual transmission. An engagement and disengagement device acts on the shifting clutch. Furthermore, the drive device comprises an actuating drive for the engagement and disengagement device, which actuating drive has a second drive shaft with an axis, about which the second drive shaft can be at least pivoted. The rotational axis of the first drive shaft and the axis of the second drive shaft are parallel to one another. The drive device has a third torque-proof operative connection between the second drive shaft and an actuating converter which can be driven at least indirectly by means of the second drive shaft and which acts on the shifting clutch in a linearly movable manner.

A transmission arrangement for a motor vehicle is apparent from DE 10 2015 214 031 A1, comprising a transmission input stage and a differential which is connected to it via a common planetary carrier. The differential has a first and a second planetary set, the first planetary set meshing with a first sun, and the second planetary set meshing with a second sun. Furthermore, the two planetary sets of the differential mesh with one another in pairs. The transmission input stage has a drive sun which meshes with a first planetary set, the first planetary set being connected fixedly to a second planetary set so as to rotate with it. The two planetary sets of the transmission input stage are mounted together with the first planetary set of the differential rotatably on a first pin which is arranged on the planetary carrier.

SUMMARY

A drive device for a motor vehicle includes a drive machine which is operatively connected via a drive shaft to a transmission device, the transmission device having a first planetary set with a plurality of planetary gears, a multi-step planetary set with a plurality of multi-step planetary gears, and a differential transmission with a second and third planetary set with in each case a plurality of planetary gears, the planetary gears of the first planetary set being arranged rotatably on a first planetary carrier and being in tooth engagement radially between a first sun and a first internal gear, each multi-step planetary gear having a first and a second gearwheel which are connected fixedly to one another so as to rotate together, the multi-step planetary gears being arranged rotatably on a second planetary carrier, the first gearwheel being in tooth engagement with a second sun, and the second gearwheel being in tooth engagement with a second internal gear, and the first planetary carrier being connected fixedly to the second sun so as to rotate with it, and the first internal gear being fixed on a housing in a stationary manner, the respective planetary gears of the second and third planetary set, furthermore, the respective planetary gears of the second and third planetary set being mounted rotatably on the second planetary carrier, the planetary gears of the second planetary set being in tooth engagement with a third sun, and the planetary gears of the third planetary set being in tooth engagement with a fourth sun, and the planetary gears of the second planetary set being in tooth engagement in pairs with the planetary gears of the third planetary set.

In other words, the attachment of the multi-step planetary set on the first planetary set takes place via the first planetary carrier which is connected fixedly to the second sun so as to rotate with it. Via the differential transmission which is preferably configured as a spur gear differential, the drive power of the drive machine is distributed to two output shafts of a drive axle of the vehicle. The respective output shaft is connected at least indirectly to a respective wheel. The third sun can preferably be connected fixedly to a first output shaft so as to rotate with it, and the fourth sun can be connected fixedly to a second output shaft so as to rotate with it. In particular, a respective spline system for receiving the respective output shaft is provided on the third and fourth sun. The multi-step planetary set and the second and third planetary set of the differential transmission are received jointly on the second planetary carrier.

The term "operatively connected" is to be understood to mean that two elements can be connected directly to one another, or further elements can also be situated between two elements, for example one or more gearwheels or shafts.

Two gearwheels which mesh with one another or are in tooth engagement are provided for the transmission of a torque and a rotational speed from the one gearwheel to the other gearwheel. A "gearwheel" is to be understood to mean, for example, a sun, an internal gear, a planetary gear and a multi-step planetary gear.

In particular, the planetary gears of the third planetary set extend at least partially in an axial installation space of the second gearwheel of the multi-step planetary gears. Consequently, the planetary gears of the third planetary set and the multi-step planetary gears of the multi-step planetary set are arranged in an alternating manner on the circumference of the second planetary carrier, the second gearwheel of the multi-step planetary gears being arranged at least partially at an axial height in the circumferential direction adjacently with respect to the planetary gears of the third planetary set.

The static transmission ratio at the first planetary set may be between 2.7 and 3.5. Furthermore, the static transmission ratio at the multi-step planetary set may be between 4 and 7.5.

The second internal gear is preferably fixed on the housing in a stationary manner and is therefore connected fixedly to the housing so as to rotate with it. Furthermore, the drive shaft is preferably arranged coaxially with respect to the two output shafts, the drive shaft being configured as a hollow shaft, and the first output shaft being routed through the drive shaft. Furthermore, in particular, the first, second, third and fourth sun are arranged coaxially with respect to one another.

The drive machine is preferably configured as an electric machine with a stator and a rotor. In particular, the drive device is provided for an electric axle of a motor vehicle.

BRIEF DESCRIPTION OF THE DRAWINGS

Further measures will be shown in greater detail in the following text together with the description of one preferred exemplary embodiment on the basis of the two figures, in which:

FIG. 1 shows a simplified diagrammatic illustration of a drive device having a transmission device, and FIG. 2 shows a diagrammatic exploded illustration of the partially shown transmission device according to FIG. 1.

DETAILED DESCRIPTION

According to FIG. 1, a drive device for a motor vehicle (not shown here) has a drive machine 1 and a transmission device 3. The drive machine 1 is configured as an electric machine and has a stator 13 which is fixed on the housing and a rotor 14 which is arranged movably therein. In the present case, the transmission device 3 is flange-connected to the drive machine 1. Drive power of the drive machine 1 is introduced into the transmission device 3 via a drive shaft 2 which is arranged between the drive machine 1 and the transmission device 3. The transmission device 3 comprises a first planetary set 4a with a plurality of planetary gears 5a, a multi-step planetary set 9 with a plurality of multi-step planetary gears 10, and a differential transmission 16 with a second and third planetary set 4b, 4c which in each case have a plurality of planetary gears 5b, 5c. On account of the sectional illustration, only one planetary gear 5a of the first planetary set 4a, one multi-step planetary gear 10 of the multi-step planetary set 9, and in each case one planetary gear 5b, 5c of the second and third planetary set 4b, 4c are shown. The planetary gears 5a of the first planetary set 4a are arranged rotatably on a first planetary carrier 6a, and are in tooth engagement radially between a first sun 7a and a first internal gear 8a. The first internal gear 8a is fixed on a housing 12 of the transmission device 3 in a stationary manner. Each multi-step planetary gear 10 has a first and a second gearwheel 11a, 11b which are connected fixedly to one another so as to rotate together, the multi-step planetary gears 10 being arranged rotatably on a second planetary carrier 6b. The first gearwheel 11a is in tooth engagement with a second sun 7b, and the second gearwheel 11b is in tooth engagement with a second internal gear 8b. The first gearwheel 11a has a greater diameter than the second gearwheel 11b. The first planetary carrier 6a is connected fixedly to the second sun 7b so as to rotate with it.

The respective planetary gears 5b, 5c of the second and third planetary set 4b, 4c are mounted rotatably on the second planetary carrier 6b. The planetary gears 5b of the second planetary set 4b are in tooth engagement with a third sun 7c, and the planetary gears 5c of the third planetary set 4c are in tooth engagement with a fourth sun 7d. Furthermore, the planetary gears 5b of the second planetary set 4b are in tooth engagement in pairs with the planetary gears 5c of the third planetary set 4c. The third sun 7c is connected fixedly to a first output shaft 15a so as to rotate with it, and the fourth sun 7d is connected fixedly to a second output shaft 15b so as to rotate with it. The differential transmission 16 is configured as a spur gear differential. The drive shaft 2 is arranged coaxially with respect to the two output shafts 15a, 15b, the drive shaft 2 being configured as a hollow shaft, and the first output shaft 15a being routed through the drive shaft 2. The two output shafts 15a, 15b belong to a drive axle of the motor vehicle. As a consequence, the drive device is provided as an electric drive axle of the motor vehicle. The static transmission ratio at the first planetary set 4a is advantageously between 2.7 and 3.5, the static transmission ratio at the multi-step planetary set 9 advantageously being between 4 and 7.5. As a consequence, the illustrated construction of the transmission device 3 realizes a relatively high transmission ratio and power density.

According to FIG. 2, the transmission device 3 from FIG. 1 is shown partially. It is noted that the first planetary set 4a and the first sun 7a and the first internal gear 8a are not shown. The second sun 7b is in tooth engagement with the first gearwheel 11a of the multi-step planetary gear 10 which is received on the second planetary carrier 6b. The second gearwheel 11b of the multi-step planetary gear 10 is in tooth engagement with the second internal gear 8b which is fixed on the housing. The way is particularly clearly apparent from FIG. 2, in which the respective multi-step planetary gears 10 of the multi-step planetary set 9 and the respective planetary gears 5b, 5c of the second and third planetary set 4b, 4c are mounted rotatably on the second planetary carrier 6b. At this point, in order to explain this arrangement, reference is made, in particular, to the description of the figures in paragraphs [0019] to [0024] and to FIGS. 1 to 4 of document DE 10 2015 214 031 A1 in respect of the prior art which was cited at the outset. The transmission arrangement from DE 10 2015 214 031 A1 is identical and is therefore structurally identical to the multi-step planetary set 9 which is shown in FIG. 2 with the differential transmission 16 which is connected to it. It is noted, in particular, that the planetary gears 5c of the third planetary set 4c extend at least partially in an axial installation space of the second gearwheel 11b of the multi-step planetary gears 10. Together with the differential transmission 16, the multi-step planetary set 9 forms a particularly compact unit.

LIST OF DESIGNATIONS

1 Drive machine
2 Drive shaft
3 Transmission device
4a, 4b, 4c Planetary set
5a, 5b, 5c Planetary gear
6a, 6b Planetary carrier
7a, 7b, 7c, 7d Sun
8a, 8b Internal gear
9 Multi-step planetary set
10 Multi-step planetary gear 11a, 11b Gearwheel
12 Housing
13 Stator
14 Rotor
15a, 15b Output shaft
16 Differential transmission

The invention claimed is:

1. A drive device for a motor vehicle, comprising a drive machine which is operatively connected via a drive shaft to a transmission device, the transmission device having a first planetary set with a plurality of planetary gears, a multi-step planetary set with a plurality of multi-step planetary gears, and a differential transmission with a second and third planetary set, each of the first, second, and third planetary sets having a plurality of planetary gears, the planetary gears of the first planetary set being arranged rotatably on a first planetary carrier and being in tooth engagement radially between a first sun and a first internal gear, each multi-step planetary gear having a first and a second gearwheel which are connected fixedly to one another so as to rotate together, the multi-step planetary gears being arranged rotatably on a second planetary carrier, the first gearwheel being in tooth engagement with a second sun, and the second gearwheel being in tooth engagement with a second internal gear, and the first planetary carrier being connected fixedly to the second sun so as to rotate with it, and the first internal gear being fixed on a housing in a stationary manner, the respective planetary gears of the second and third planetary set, furthermore, being mounted rotatably on the second planetary carrier, the planetary gears of the second planetary set being in tooth engagement with a third sun, and the planetary gears of the third planetary set being in tooth engagement with a fourth sun, and the planetary gears of the second planetary set being in tooth engagement in pairs with the planetary gears of the third planetary set.

2. The drive device of claim 1, wherein the drive machine is an electric machine with a stator and a rotor.

3. The drive device of claim 1, wherein the third sun is adapted for fixation to a first output shaft so as to rotate therewith, and the fourth sun is adapted for fixation to a second output shaft so as to rotate therewith.

4. The drive device of claim 3, wherein the drive shaft is arranged coaxially with respect to the first and second output shafts, the drive shaft being a hollow shaft, and the first output shaft being routed through the drive shaft.

5. The drive device of claim 1, wherein the second internal gear is fixed on the housing in a stationary manner.

6. The drive device of claim 1, wherein the planetary gears of the third planetary set extend at least partially in an axial installation space of the second gearwheel of the multi-step planetary gears.

7. The drive device of claim 1, wherein a static transmission ratio of the first planetary set is between 2.7 and 3.5.

8. The drive device of claim 1, wherein a static transmission ratio of the multi-step planetary set is between 4 and 7.5.

9. A drive device comprising:
a first planetary gearset having a first sun gear fixed to a driveshaft, a first carrier, a first ring gear held against rotation, and a plurality of first planet gears supported for rotation with respect to the first carrier and meshing with the first sun gear and with the first ring gear;
a second planetary gearset having a second sun gear fixed to the first carrier, a second carrier, a second ring gear held against rotation, and a plurality of multi-step planet gears, each multi-step planet gears having a first gearwheel fixed to a second gearwheel, each first gearwheel meshing with the second sun gear, each second gearwheel meshing with the second ring gear; and
a differential.

10. The drive device of claim 9 further comprising an electric motor having a stator and a rotor fixed to the driveshaft.

11. The drive device of claim 9 wherein the differential comprises:
a third sun gear fixed to a first output shaft;
a fourth sun gear fixed to a second output shaft;
a plurality of third planet gears supported for rotation with respect to the second carrier and meshing with the third sun gear; and
a plurality of fourth planet gears supported for rotation with respect to the second carrier and meshing with the fourth sun gear, each fourth planet gear also meshing with one of the third planet gears.

12. The drive device of claim 11 wherein the driveshaft is hollow and the first output shaft extends through the driveshaft.

13. The drive device of claim 11 wherein the second gearwheels overlap axially with the third planet gears.

* * * * *